United States Patent [19]

Rose

[11] 4,162,882

[45] Jul. 31, 1979

[54] VALVE MECHANISM FOR SANDWICH CREME

[75] Inventor: Edward Rose, Skokie, Ill.

[73] Assignee: Peters Machinery Company, Chicago, Ill.

[21] Appl. No.: 888,867

[22] Filed: Mar. 22, 1978

[51] Int. Cl.² .............................. B29F 3/01; B29F 3/04
[52] U.S. Cl. ............................ 425/376 B; 99/450.04; 99/450.7; 118/25; 118/301; 118/313; 137/625.11; 137/625.16; 222/486; 222/553; 251/208; 251/304; 251/345
[58] Field of Search ................... 118/24, 25, 301, 313; 425/381, 376 B; 137/625.11, 625.16; 251/207, 208, 304, 345; 99/450.4, 450.7; 222/485, 486, 553, 554

[56] References Cited

U.S. PATENT DOCUMENTS

| | | | |
|---|---|---|---|
| 2,846,960 | 8/1958 | Gavotsos | 99/450.4 |
| 2,993,453 | 7/1971 | Fay | 99/450.7 |
| 3,119,352 | 1/1964 | Fay | 118/25 |
| 3,276,397 | 10/1966 | Poppe et al. | 118/24 |
| 3,340,824 | 9/1967 | Talbot | 425/381 |
| 3,983,798 | 10/1976 | Crispe | 99/450.4 |

*Primary Examiner*—W. E. Hoag

*Attorney, Agent, or Firm*—Hill, Van Santen, Steadman, Chiara & Simpson

[57] ABSTRACT

Valve mechanism supplying creme on the tops of a succession of two rows of cookies for sandwiching. The cookies are moved along a sandwiching machine by a conveyor beneath a rotating stencil supplying creme to the cookies, under the control of a one-piece valve assuring a uniform supply of creme on the tops of cookies of each row of cookies to thereafter be sandwiched by other cookies supplied to the cremed cookies as passing along the conveyor. The valve is in the form of a one-piece valve block supported at one end and rotationally adjusted to balance the flow through orifices in a stencil sleeve within which the valve is mounted. The creme enters the stencil sleeve from one end of the tube. The stencil sleeve has an outlet port for each row of cookies, which in turn supplies the creme to annular orifices in a rotating stencil, rotating at the speed of travel of the conveyor and the cookies carried thereby. The valve may be adjusted to shut off the flow entirely and proportion the flow between the two orifices to assure the same amount of creme be supplied to the row farthest from the inlet to the valve as to the closer row as the scroll is rotated to supply creme to the two rows of cookies.

10 Claims, 13 Drawing Figures

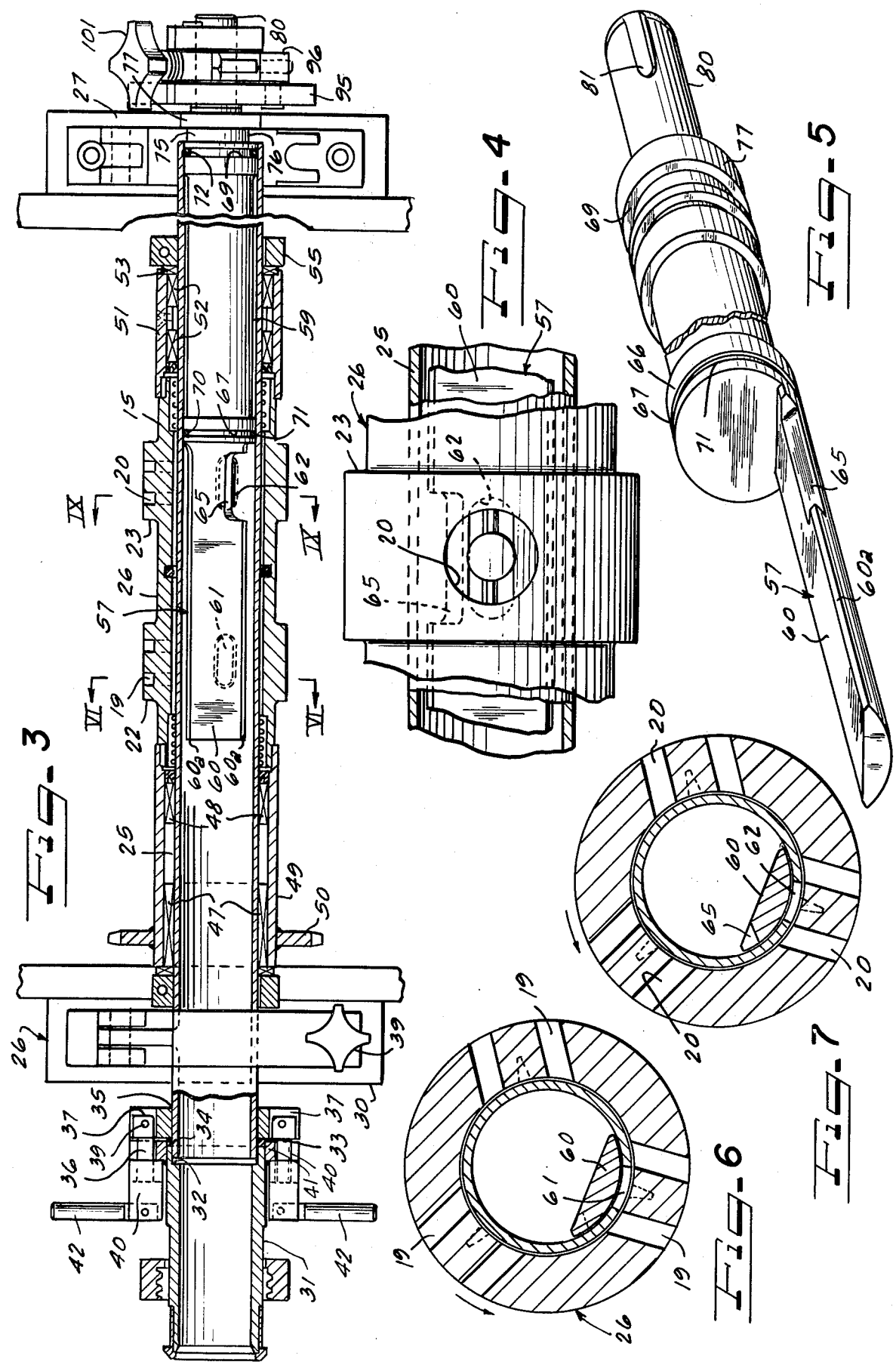

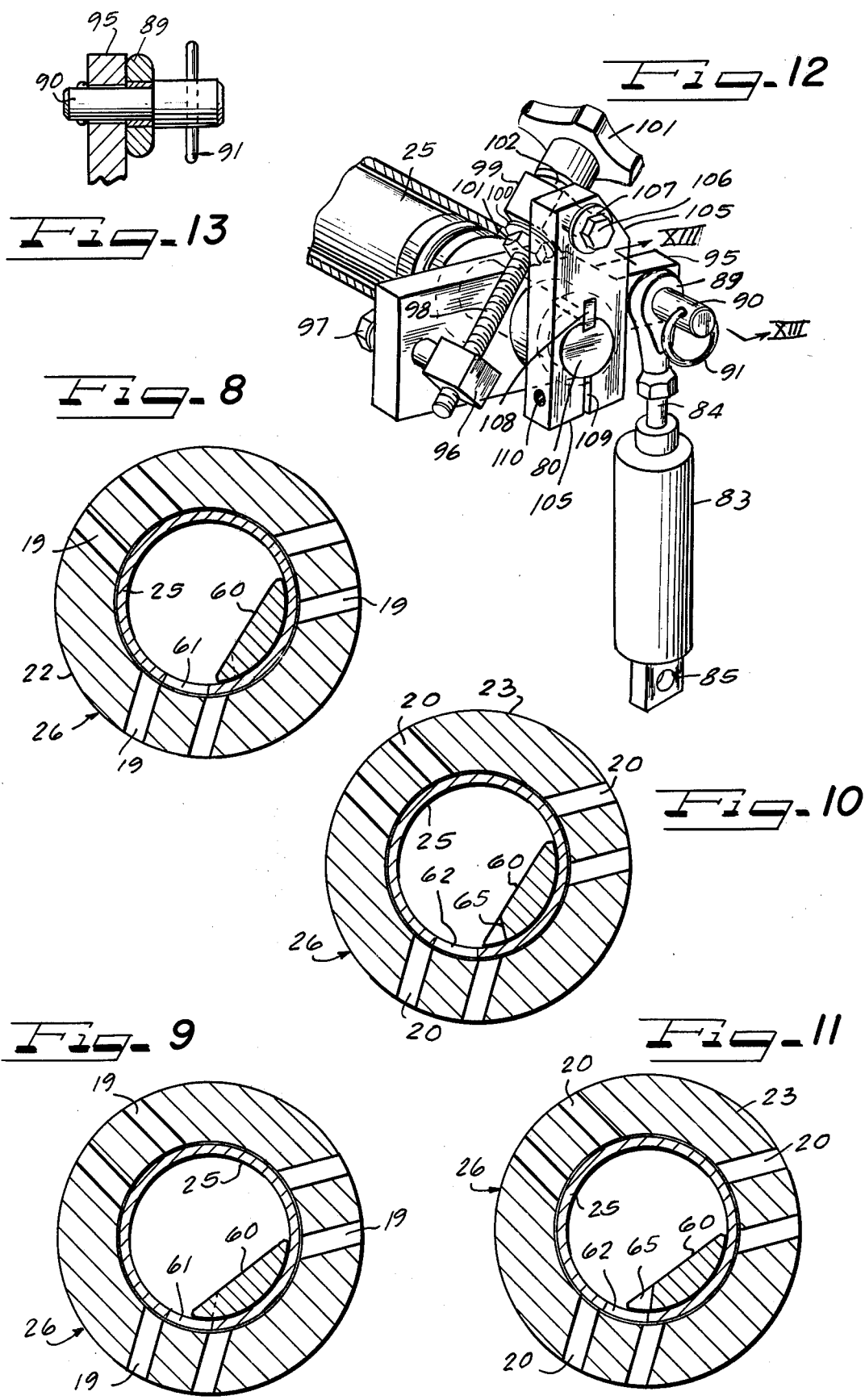

VALVE MECHANISM FOR SANDWICH CREME

BACKGROUND, SUMMARY AND ADVANTAGES OF INVENTION

Heretofore, sandwiching machines have been provided for supplying creme to rows of cookies traveling in side-by-side relation. The rows of cookies are carried in side-by-side relation along taut wires by conveyors traveling at the same rates of speed and beneath a creme supply means and then beneath a hopper depositing other cookies on top of the creme and thus forming a sandwich with the creme between two cookies. Such machines are shown in the Patents to R. J. Fay U.S. Pat. Nos. 2,993,453 and 3,119,352 and in the Patent to Talbot U.S. Pat. No. 3,340,824 assigned to the assignee of the present invention.

The present invention is an improvement on the equalizing and shut-off valve of the Talbot U.S. Pat. No. 3,340,824 in that the valve and block are in one piece instead of two individual pieces and the block is supported at one end and rotationally adjusted from the same end to balance the flow through orifices in a stencil tube encircling the valve and also forming an inlet for the supply of creme to the valve. The stencil tube is within a rotatable stencil having orifices leading therefrom in two rows and driven to rotate at the speed of travel of the cookies along the conveyor, to deposit creme on the cookies as passing thereunder along the conveyor. The rows of orifices leading from the stencil may be annular for uniformly supplying creme to the cookies as passing thereunder.

In order that the orifice farthest away from the source of supply of creme may receive the same amount of creme as the orifice closest to the source of supply, the valve is arranged to equalize the supply of creme to the two rows of cookies. The valve, for example, may be half open for the first row and fully open for the farthest row. Where necessary, it may be adjusted to a fourth open position for the nearest row and a three-quarters open position for the farthest row, to assure that the farthest row of cookies receives the same amount of creme as the nearest row. The adjustments depend upon consistency of the creme and may be infinitely varied by means of a simple adjusting mechanism at the opposite end of the valve from its inlet end.

The principal advantages of the present valve are that the valve provides a larger area for creme flow than prior valves, resulting in lower pumping pressure and pump speed, a reduction in the rise in creme temperature due to the requirement of less work by the pump, a reduction in separation of oil from sugar in the creme due to lower temperature and pressure, and less hardening of the creme in the valve because of less oil separation.

A further advantage is that there is less liability of clogging of the valve openings by hardened creme and the reduction of freezing or sticking of the valve in the stencil sleeve.

A further advantage is that the valve gives a more uniform equalization of creme deposit, is of a simpler construction and easier to maintain than prior valves with a reduced cost of manufacture.

A further advantage is that the valve is more sanitary for food handling because it has fewer crevices than the prior art valves and thus is easier to clean.

A still further advantage of the invention is that the larger area for creme flow permits the application of creme containing solid particles such as nuts, candies and other particles.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE DRAWINGS

FIG. 3 is a transverse sectional view taken through the stencil and stencil sleeve illustrating the support for the stencil and stencil sleeve as well as the support and adjusting means for the valve in plan, with the half of the quick release support adjacent the adjustment end of the valve removed;

FIG. 4 is a fragmentary view looking at the stencil and stencil sleeve in plan in order to show one of the annular creme orifices in the stencil;

FIG. 5 is a generally perspective view of the valve and its body;

FIG. 6 is a sectional view taken substantially along lines VI—VI of FIG. 3, showing the valve in its fully closed position for the first and second orifice in the stencil sleeve;

FIG. 7 is a sectional view taken through the second orifice in the stencil and showing the orifice in the stencil sleeve in a fully closed position;

FIG. 8 is a sectional view showing the orifice in the stencil for the first row of cookies in its fully open position;

FIG. 9 is a sectional view somewhat similar to FIGS. 6, 7 and 8, but showing the orifice in the stencil sleeve for the first row of cookies in a half-open position;

FIG. 10 is a view somewhat similar to FIG. 8, but showing the orifice in the stencil for the second row of cookies in a fully open position;

FIG. 11 is a sectional view somewhat similar to FIG. 9, but showing the orifice in the stencil sleeve for the second row of cookies in a fully open position;

FIG. 12 is a generally perspective view of the adjusting mechanism, illustrating the means for moving the valve to a fully open and fully closed position, and the adjusting means for apportioning the orifices in the stencil to deliver the same amount of creme to each row of cookies; and FIG. 13 is a fragmentary sectional view taken substantially along lines XIII—XIII of FIG. 12 in order to illustrate the quick disconnect for the piston rod of the adjusting mechanism, from the adjusting mechanism to accommodate disassembly of the valve and stencil for cleaning.

DESCRIPTION OF PREFERRED EMBODIMENT OF INVENTION

Figure 1:
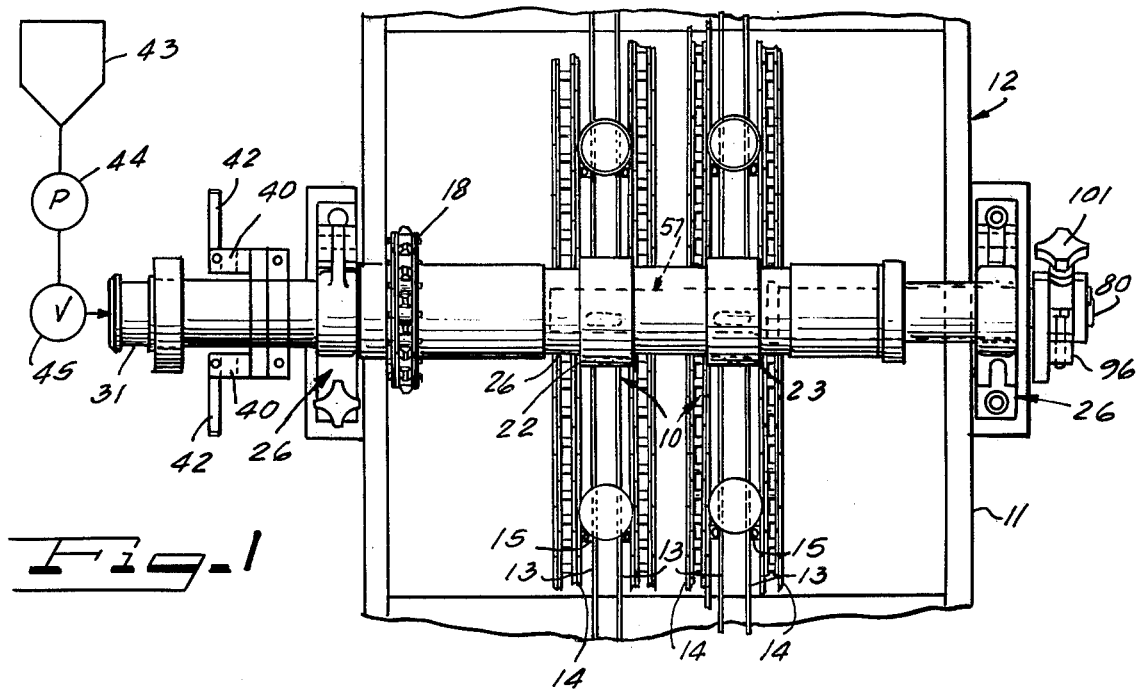
FIG. 1 is a partial fragmentary top plan view showing the stencil and valve adjusting mechanism, the conveyor for the two rows of cookies and the mounting of the stencil on the machine frame, as well as the supply end of the stencil with a source of supply, pump, and control valve shown diagrammatically.
Figure 2:
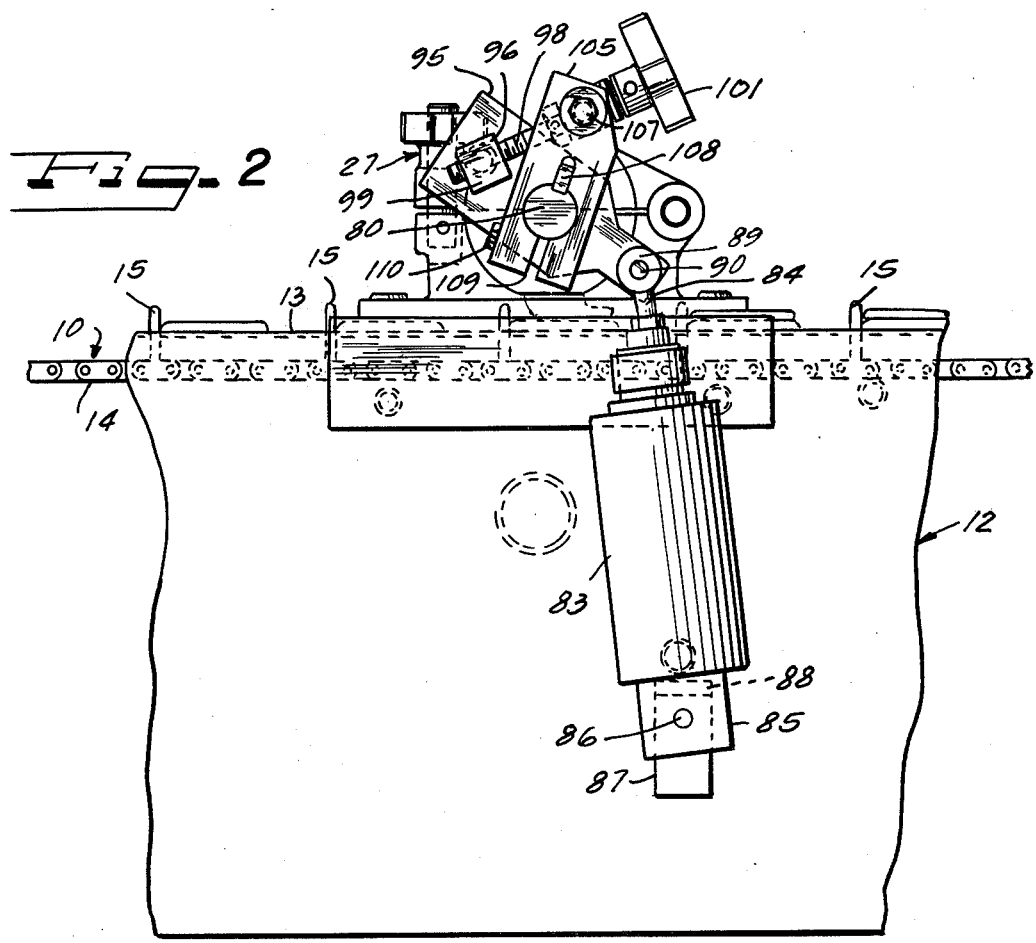
FIG. 2 is a fragmentary side elevational view of a portion of the machine, looking at the machine from the valve end of the machine and illustrating the adjusting mechanism for the valve.

In the embodiment of the invention illustrated in the drawings, I have shown in FIGS. 1 and 2, two side-by-side chain types of conveyors 10 movable between and along side frame members 11 of a main frame 12 of the machine. The conveyors are each driven from a common drive shaft and move the cookies along taut wires 13, 13 parallel to each other and extending along each side of each conveyor chain for the length of the machine. The conveyor and wire construction is similar to that shown in the Fay U.S. Pat. No. 3,119,352 and no part of the present invention, so not shown or described herein. Each chain has a series of equally spaced fingers 15, 15 extending upwardly therefrom for moving the cookies along the wires 13, 13 is equally spaced relation with respect to each other beneath a stencil 16 as in Talbot U.S. Pat. No. 3,340,824, incorporated herein as a part hereof, so not shown or described further.

The stencil 16 is of a tubular form and driven by a chain and sprocket drive 18 to rotate at the speed of travel of the conveyors and effect the discharge of creme through stencil ports 19 and 20 leading through lands 22 and 23 extending outwardly of the stencil. The lands 22 and 23 are spaced apart a distance equal to the spacing between the centers of the conveyor chains 14 to deposit creme on the rows of cookies conveyed along the wires 13 by the fingers 15.

As shown in FIG. 3, annular ports 19 and 20 lead through the respective lands 22 and 23 and are shown in FIG. 6 as struck about centers spaced 120° apart. The shape of the ports and spacing is such as to apply creme to the entire face of a cookie passing thereunder in a uniform layer. A wire (not shown), like that shown in the Talbot U.S. Pat. No. 3,340,824, may cut the creme from the stencil.

A stencil sleeve 25 forms a support for the stencil and extends for the entire width of the machine and is clamped in a stationary position. The stencil sleeve 25 is clamped in position at its ends by quick releasable clamps 26 and 27, like those shown in the aforementioned Talbot Patent, so not described in detail herein.

The creme-receiving end of the stencil is shown in FIG. 3 as having an inlet fitting 31 releasably clamped thereto. Said inlet fitting has a recessed or shouldered portion 32 extending thereabout having a recessed inner end 33 for an O-ring 34, having a sealing engagement with an annular member 35 extending about the stencil sleeve 25 and suitably secured to said stencil sleeve. The annular member 35 forms a mounting for studs 36 extending within bifurcated portions 37 of said annular member and pivotally connected between the furcations thereof on pivot pins 39. The studs may be threaded in blocks 40 and engage a collar 41 extending about the inlet fitting with the annular member 35 and clamp the inlet end of the inlet fitting to the inlet end of the stencil tube. Arms 42 pivoted to the blocks 40 provide a quick release for the inlet fitting for cleaning of said inlet fitting or renewal of the O-ring 34. The inlet fitting 31 is diagrammatically shown in FIG. 1 as connected with a source of supply of creme 43 through a pump 44 and shut-off valve 45.

The outer periphery of the stencil sleeve 25 has spaced bearings 47 and 48 thereon for a stencil drive sleeve 49, which may be splined or keyed to the driven end of the stencil. A sprocket 50 may be welded or otherwise secured to the outer periphery of the stencil drive sleeve 49 for driving the stencil 16 to rotate at the speed of travel of the conveyor chains 14. The sprocket 50 is the driving sprocket of the chain and sprocket drive 18. The opposite end of the stencil from the drive sleeve 49 and sprocket 50 is keyed or otherwise secured to a sleeve 51 journalled on the stencil on bearings 52 and abutting a thrust washer 53, which in turn abuts a collar 55 suitably secured to the stencil sleeve.

The stencil sleeve 25 extends through the side frame member of the main frame of the machine and is supported and held in position by the clamp 27, mounted on the outer side of said side frame member. The clamp 27 may be a quick detachable clamp, permitting ready disassembly of the stencil and sleeve for cleaning in a manner similar to that shown in the Talbot U.S. Pat. No. 3,340,824.

A valve 57 has a valve block 59 mounted within the opposite end of the stencil sleeve from the inlet end of said stencil (FIGS. 3 and 4) for adjustable movement about the axis of the stencil sleeve, as will hereinafter more clearly appear as this specification proceeds.

The valve 57 is in the form of an elongated valve member 60 extending from said valve block toward the inlet end of the stencil sleeve, and in the form of the segment of a circle, the arc of which conforms to the internal diameter of the stencil sleeve. The valve member 60 has a relatively flat top portion and beveled sides 60a extending therealong. Said valve member extends along elongated ports 61 and 62 of the stencil sleeve 25. The port 61 is the closest to the inlet end of the stencil sleeve and in alignment with the row of cookies closest to the inlet end of the stencil sleeve. Said valve member 60 has a cut-away portion 65 in registry with the port 62, farthest from the inlet end of the stencil sleeve and in vertical alignment with the second row of cookies. The ports 61 and 62, when open, afford a passageway to the respective ports 19 and 20 leading through the lands 22 and 23 of the stencil for depositing creme directly on the rows of cookies passing thereunder when in registry with said ports 61 and 62 and when said ports are in an open or partially open position.

As for example, when the ports 61 and 62 are closed, both for rows 1 and 2, there will be no flow of creme through the ports 61 and 62 and the ports 19 and 20 in the lands 22 and 23 and in association with the respective rows 1 and 2 as shown in FIGS. 6 and 7. The valve member 60 has a cut-away portion 65 in association with the port 62 and row 2. The recessed portion 65 provides an equalizing feature by which the valve may be adjusted to equalize the flow through the ports 61 and 62, which would otherwise be reduced through the port 62, due to the increased distance of the port 62 from the port 61.

The valve 57 includes a valve block 66 extending from the valve member 60 and having annular grooves 67 and 69 formed therein for O-rings 71 and 72, respectively to seal said valve block to the stencil sleeve 25 (FIG. 3). Said valve block also has an annular groove 75 formed therein to receive a retaining finger 76, to retain the valve block and valve in the proper alignment with the ports 61 and 62. The finger 76 may be a part of the release clamp 27, as shown in FIG. 3. Outwardly of the groove 75 is an enlarged diameter portion 77, rotatably mounting the valve block and valve in the quick release clamp 27 accommodating ready removal of the stencil sleeve and valve from the machine frame for cleaning. The clamp 27 may be similar to that shown in the Talbot U.S. Pat. No. 3,340,824, so need not herein be shown or described further. Outwardly of the enlarged diameter portion 77 is a shaft portion 80 having a keyway 81 opening to the end thereof and affording a means for rotatably adjusting the valve block to move the valve 60 and apportion the size of the orifices 61 and 62 in accordance with creme flow to assure that the orifice 62 discharges the same amount of creme as the orifice 61 through the respective orifices 19 and 20 and thereby assure that the same amount of creme be deposited on each row of cookies as the respective orifices 19 and 20 pass thereover.

The valve 57 is turned on and off by a cylinder 83 having a piston (not shown) therein and a piston rod 84 extensible therefrom (FIG. 12). The cylinder 83 has an ear 85 depending from its head end pivotally connected to a side frame 11 of the machine frame 12 as by a pivot pin 86 (FIG. 2). As shown in FIG. 2, an angle or other member 87 is suitably secured to the side frame member 11 along its vertical leg and has a right-angled leg 88 abutting the ear 85 to maintain the proper spacing between the cylinder 83 and the side frame member 11. The outer end of the piston rod 84 has a connector 89 thereon and pivotally connected to one end of an arm 95 freely mounted on the shaft 80.

The connection from the connector 89 to the arm 95 is shown in FIGS. 12 and 13 as a quick detachable connection in the form of a headed pin 90, the inside of the head of which abuts the connector 89. The head of the pin 90 has a ring 91 extending through the outer end thereof, to accommodate ready disassembly of the piston rod from the arm 95. The pin may be releasably held in position by a simple form of ball and detent releasable lock. The arm 95 is freely mounted on the shaft 80 intermediate its ends. Said arm 95 has a block 96 pivoted to the end of said arm opposite the pin 90 as by a bolt 97 freely pivotally mounted on said arm 95. The block 96 thus is gudgeoned to the arm 95 and forms an adjusting block for the shaft 80. An adjusting screw 98 is threaded in said block 96 and extends through a block 99 pivoted to an arm 105 keyed to the shaft 80 and held in position relative to said block as by a thrust washer 100 and a nut 101 threaded on said adjusting screw. The adjusting screw 98 extends through the block 99 and has a hand wheel 101 on its free end, to rotate said adjusting screw upon turning movement of said hand wheel. A thrust washer 102 is interposed between the hub of said hand wheel and the block 99. The block 99 is pivotally mounted on the free end of the arm 105 as by a bolt 106 threaded in said block and suitably locked thereto. A thrust washer 107 is interposed between the head of said bolt 106 and the block 99. The arm 105 is keyed to the end of the valve shaft 80 as by a key 108 and is split at its lower end as indicated by reference numeral 109. A bolt 110 is provided to clamp the arm 105 to the end of the shaft 80 and assure that said arm stays on said shaft, but to accommodate ready removal thereof from the end of said shaft where desired.

Thus, when the piston rod is in its fully extended position, the arm 95 will be pivoted to pivot the shaft 80 through the block 96, adjusting screw 98 and arm 105 to its fully on position.

When the piston rod 84 is in the retracted position shown in FIG. 12, the shaft 80 will be pivoted in an opposite direction into position to move the valve member 60 to close the ports 61 and 62. When it is desired to adjust the valve to provide a uniform discharge of creme on each row of cookies, the hand wheel 101 may be turned to pivot the arm 105, shaft 80 and valve member 60 the required amount to supply a uniform amount of creme to each row of cookies passing thereunder.

When it is necessary to equalize the flow to the two rows of cookies and reduce the flow through the orifice 61 and to the cookies in row 1, the hand wheel 101 and adjusting screw 98 can be turned to rotate the valve 60 in a direction which will partially close off the port 61. This may fully open the port 62 for row 2.

As for example, FIG. 9 shows the valve 60 in position to half close the port 61 and fully open the port 62, due to the cut-away portion 65 of the valve. The valve opening will thus be in the ratio of 2:1 between slot 62 and slot 61, since the orifices or slots 61 and 62, as shown, are one-half inch wide and the slot 61 is closed one-fourth inch while the slot 62 is wide open. Applicant, however, does not desire to be limited to the particular dimensions shown, since they may be varied as conditions require.

Further rotation of the hand wheel and adjusting screw may close off the slot 61 to one-eighth inch open and the slot or orifice 62 to a three-eighths inch opening, giving a ratio of 3:1 between the orifices 61 and 62.

Turning of the adjusting screw 98 can give ratios of tube openings from 1:1 to 2:1, 3:1 to 4:1, etc., so as to obtain an equal flow of creme volume and weight through each of the orifices 61 and 62.

FIG. 10 shows the valve in maximum opened position for the slots 61 and 62 while FIGS. 6 and 7 show the valve in closed position for slots 61 and 62 when adjusted for a 2:1 ratio between slots 61 and 62.

An infinite number of openings may be attained by turning the adjusting screw 98 and these openings are attained by a single valve cooperating with the two orifices or slots 61 and 62 for the two rows of cookies. A uniform discharge of creme is thus assured for each row of cookies regardless of the consistency of the creme, it being understood that the necessary adjustment of the valve depends upon the consistency of the creme and the distance between the rows of cookies.

It should further be understood that the valve, being a single thin valve with no crevices for the collection of creme, requires less cleaning than normal valves used for this purpose and when necessary to clean the valve or stencil tube, the valve and stencil tube may readily be removed from the shaft or body end of the valve by quick disconnect connections, further facilitating the cleaning of the stencil sleeve and valve as well as the stencil rotatably mounted on the stencil sleeve.

Furthermore, since the valve is a simple one-piece valve, it is possible to increase the cookies sandwiched over prior sandwiching machines and sandwich as many as 2000 per minute, and thus double the amount of cookies sandwiched from those of the Talbot U.S. Pat. No. 3,340,824 accompanying this specification.

It should be understood that I do not desire to limit myself to the sandwiching of round cookies, but rectangular cookies and other articles of food may be sandwiched as well without departing from the spirit and scope of the present invention.

I claim as my invention:

1. In extrusion apparatus for use in applying creme to at least two laterally spaced rows of cookies travelling along a sandwiching machine at the same rates of speed, the improvement comprising:
   a rotating stencil disposed above said rows of cookies and extending transversely thereof, said stencil having a series of annular ports therein corresponding to the spacing between the centers of said rows of cookies and of an outer diameter corresponding to the amount of creme to be deposited on the cookies, means rotatably driving said stencil at the speed of travel of the cookies, a non-rotatable stencil sleeve closely fitting said stencil and having at least two longitudinally spaced aligned ports therein corresponding to the spacing of the ports in said stencil, said stencil sleeve forming a bearing support for said stencil, a creme inlet into one end of said stencil sleeve, and a single valve spaced from said inlet and extending axially of said stencil sleeve and adjustable to equalize the flow of creme through said ports in said stencil sleeve and assure that the row of cookies farthest from said inlet receives the same amount of creme as the row of cookies closest to said inlet, said valve having a cross-section which is a segment of a circle and being integral with a generally cylindrical valve block and extending generally axially therefrom.

2. The creme delivery means of claim 1 in which the valve is adjustable about the axis of said stencil sleeve and is constructed to equalize the flow of creme to both rows of cookies, and means are provided for adjusting said valve in accordance with the consistency of the creme supplied and thereby assure the same amount of creme be supplied to the port leading through said stencil sleeve farthest from said inlet as to the port closest to said inlet.

3. The creme delivery means of claim 1 in which the valve includes a valve member extending along said stencil sleeve toward said creme inlet into said stencil sleeve and over said ports in said stencil sleeve and generally conforming to the internal diameter of said stencil sleeve, and has a stepped portion in registry with the port farthest from the inlet to said stencil sleeve, and so arranged as to assure the port farthest from said stencil inlet opens a greater extent than the port closest to said stencil inlet and thereby assure a uniform supply of creme to each port and row of cookies therebeneath.

4. The creme delivery means of claim 1 in which the valve includes a valve member extending along said stencil sleeve toward the inlet of creme to said stencil sleeve and over said ports, and the valve member generally conforms to the internal diameter of said stencil sleeve, said valve member having a portion stepped inwardly from the leading edge thereof and in alignment with the port farthest from the inlet to said stencil sleeve to apportion the discharge openings of said ports and assure the supply of the same amount of creme to the port farthest from said stencil inlet as to the port closest to said stencil inlet.

5. The creme delivery means of claim 1 in which the valve block is rotatably adjustable the ports in said stencil sleeve are elongated ports corresponding to the internal diameters of said annular ports leading through said stencil and the one-piece valve has a cut-away portion registrable with the port farthest from the inlet to said stencil sleeve.

6. The creme delivery means of claim 5 in which the valve element is adjustable to an infinite number of ratios between the discharge openings of said ports through said stencil sleeve to assure a uniform supply of creme to each row of cookies and to accommodate the supply of creme having nuts and other relatively solid matter therein, and the size of the port openings in said stencil sleeve and varied by said valve, depending upon the consistency of the creme supplied through said inlet.

7. The creme delivery means of claim 1 in which the valve includes a valve block generally conforming to the internal diameter of said stencil sleeve and rotatably adjustable about the axis of said stencil sleeve, and a relatively thin valve member extending from said valve block along said stencil sleeve other both of said ports in said stencil sleeve and having a flat top surface and an arcuate valve surface corresponding to the internal diameter of said stencil sleeve having leading and trailing edges, wherein the leading edge of said valve has a cut-away portion registering with the port in said stencil sleeve farthest from the inlet thereinto to open the port farthest from said inlet a greater amount than the port closest to said inlet and thereby counteract any reduction in flow through the port farthest from said inlet caused by the spacing of said port from said inlet, and to assure that the same amount of creme be supplied to the port farthest from the inlet to said stencil sleeve as to the port closest to the inlet to said stencil sleeve, and wherein cylinder and piston means are provided to move said valve to a wide open or fully closed position and the drive from said cylinder and piston means to said valve includes adjusting means to adjust said valve no apportion the openings in said ports in accordance with the consistency of the creme supplied to said stencil sleeve.

8. The creme delivery means of claim 7 in which the valve body has a shaft portion extending outwardly of the body thereof and the cylinder and piston means has driving connection with said shaft portion to move said valve to a fully open or fully closed position.

9. The creme delivery means of claim 8 in which the cut-away portion of the valve is cut back from the leading edge thereof in alignment with the port in said stencil sleeve farthest from the inlet to said stencil sleeve.

10. The creme delivery means of claim 9 in which the ports in said sleeve are elongated ports of a length corresponding to the outside diameters of the annular orifices in said stencil and the cutaway portion is of a length equal to the length of the port in said stencil sleeve farthest from the inlet to said stencil sleeve.

* * * * *